(12) United States Patent
Kelty (10) Patent No.: US 7,485,220 B2
(45) Date of Patent: *Feb. 3, 2009

(54) WATER SKIMMER

(76) Inventor: Charles F. Kelty, 4B Water Garden Way, Santa Fe, NM (US) 87508

( * ) Notice: Subject to any disclaimer, the term of this patent is extended or adjusted under 35 U.S.C. 154(b) by 63 days.

This patent is subject to a terminal disclaimer.

(21) Appl. No.: 11/176,165

(22) Filed: Jul. 6, 2005

(65) Prior Publication Data

US 2006/0006119 A1    Jan. 12, 2006

Related U.S. Application Data

(63) Continuation-in-part of application No. 10/748,973, filed on Dec. 29, 2003, now Pat. No. 7,052,612.

(60) Provisional application No. 60/586,109, filed on Jul. 6, 2004, provisional application No. 60/436,758, filed on Dec. 27, 2002.

(51) Int. Cl.
*E04H 4/14* (2006.01)
*C02F 1/32* (2006.01)

(52) U.S. Cl. .............................. 210/167.12; 210/416.2; 210/448; 210/748

(58) Field of Classification Search .............. 210/167.1, 210/167.12, 416.1, 448, 416.2; 4/507
See application file for complete search history.

(56) References Cited

U.S. PATENT DOCUMENTS

| 1,762,314 | A |   | 6/1930  | Sutphen |            |
|-----------|---|---|---------|---------|------------|
| 2,103,316 | A |   | 12/1937 | Boosey  |            |
| 2,282,225 | A |   | 5/1942  | Hawley  |            |
| 3,059,243 | A |   | 10/1962 | Ross    |            |
| 3,661,262 | A |   | 5/1972  | Sanders |            |
| 3,677,408 | A |   | 7/1972  | Dinizo, Jr. |        |
| 3,744,637 | A | * | 7/1973  | Ziegler | 210/195.4  |
| 3,749,244 | A |   | 7/1973  | Jannuzzi, Jr. |      |
| 3,765,534 | A | * | 10/1973 | West et al. | 210/167.11 |
| 3,907,672 | A | * | 9/1975  | Milne   | 210/605    |
| 3,970,556 | A | * | 7/1976  | Gore    | 210/776    |
| 4,021,347 | A |   | 5/1977  | Teller et al. |      |
| 4,022,690 | A |   | 5/1977  | Smith   |            |
| 4,139,471 | A |   | 2/1979  | Foti    |            |
| 4,246,113 | A |   | 1/1981  | Mausgrover |         |
| 4,454,035 | A |   | 6/1984  | Gunter  |            |
| 4,752,401 | A |   | 6/1988  | Bodenstein |         |
| 5,234,588 | A |   | 8/1993  | Aymes   |            |

(Continued)

FOREIGN PATENT DOCUMENTS

DE          29816019         1/2000

(Continued)

*Primary Examiner*—Fred Prince
(74) *Attorney, Agent, or Firm*—Deborah A. Peacock; Vidal A. Oaxaca; Peacock Myers, P.C.

(57) ABSTRACT

A skimmer unit for use with a body of water. The water skimmer comprises a housing, a basket for collecting debris, and a partitioning baffle with upper openings and optionally lower openings, a skimmer chamber, and other chambers. The baffle's lower opening is preferably positioned below the rim of the perforated basket and its upper, screened or gated opening is positioned above the rim of the basket for allowing water to pass in the event of debris clogging the first opening, overflow conditions, larger flow demand, and/or filter demand.

15 Claims, 7 Drawing Sheets

U.S. PATENT DOCUMENTS

| | | | |
|---|---|---|---|
| 5,256,299 A | | 10/1993 | Wang |
| 5,285,538 A | | 2/1994 | Hodak |
| 5,759,415 A | * | 6/1998 | Adams ....................... 210/776 |
| 5,780,860 A | | 7/1998 | Gadgil et al. |
| 5,785,845 A | | 7/1998 | Colaiano |
| 6,054,045 A | * | 4/2000 | Wittstock et al. ...... 210/167.01 |
| 6,187,181 B1 | * | 2/2001 | Stoltz et al. ................. 210/122 |
| 6,322,694 B1 | | 11/2001 | Iliadis et al. |
| 6,461,501 B1 | | 10/2002 | Porter |
| 6,511,605 B2 | | 1/2003 | Connelly, Jr. |
| 2002/0139757 A1 | | 10/2002 | Connelly, Jr. |
| 2003/0094422 A1 | | 5/2003 | Perkins et al. |
| 2004/0094470 A1 | | 5/2004 | Jackson |
| 2006/0163132 A1 | * | 7/2006 | Kelty ......................... 210/169 |

FOREIGN PATENT DOCUMENTS

| | | |
|---|---|---|
| GB | 2353231 | 2/2001 |
| JP | 10-337404 | * 12/1998 |

* cited by examiner

WATER SKIMMER

CROSS-REFERENCE TO RELATED APPLICATIONS

This application is a continuation-in-part of U.S. patent application Ser. No. 10/748,973, filed Dec. 29, 2003, entitled "Skimmer and Filter", now U.S. Pat. No. 7,052,612, which itself is related to U.S. Provisional Patent Application Ser. No. 60/436,758, entitled "Method and Apparatus for Pond Skimmer and Filter, filed on Dec. 27, 2002. This application is also related to and claims priority to U.S. Provisional Patent Application Ser. No. 60/586,109 filed Jul. 6, 2004, entitled "Water Skimmer". A related PCT application 11/176,165 entitled "Water Skimmer" is filed concurrently herewith on Jul. 6, 2005. The specifications and claims of all said applications are incorporated herein by reference.

BACKGROUND OF THE INVENTION

1. Field of the Invention (Technical Field)

The present invention relates to a water skimmer. Particularly, the present invention relates to a water skimming and filtering device for removal of debris from ornamental bodies of water.

2. Description of Related Art

Figure 1:
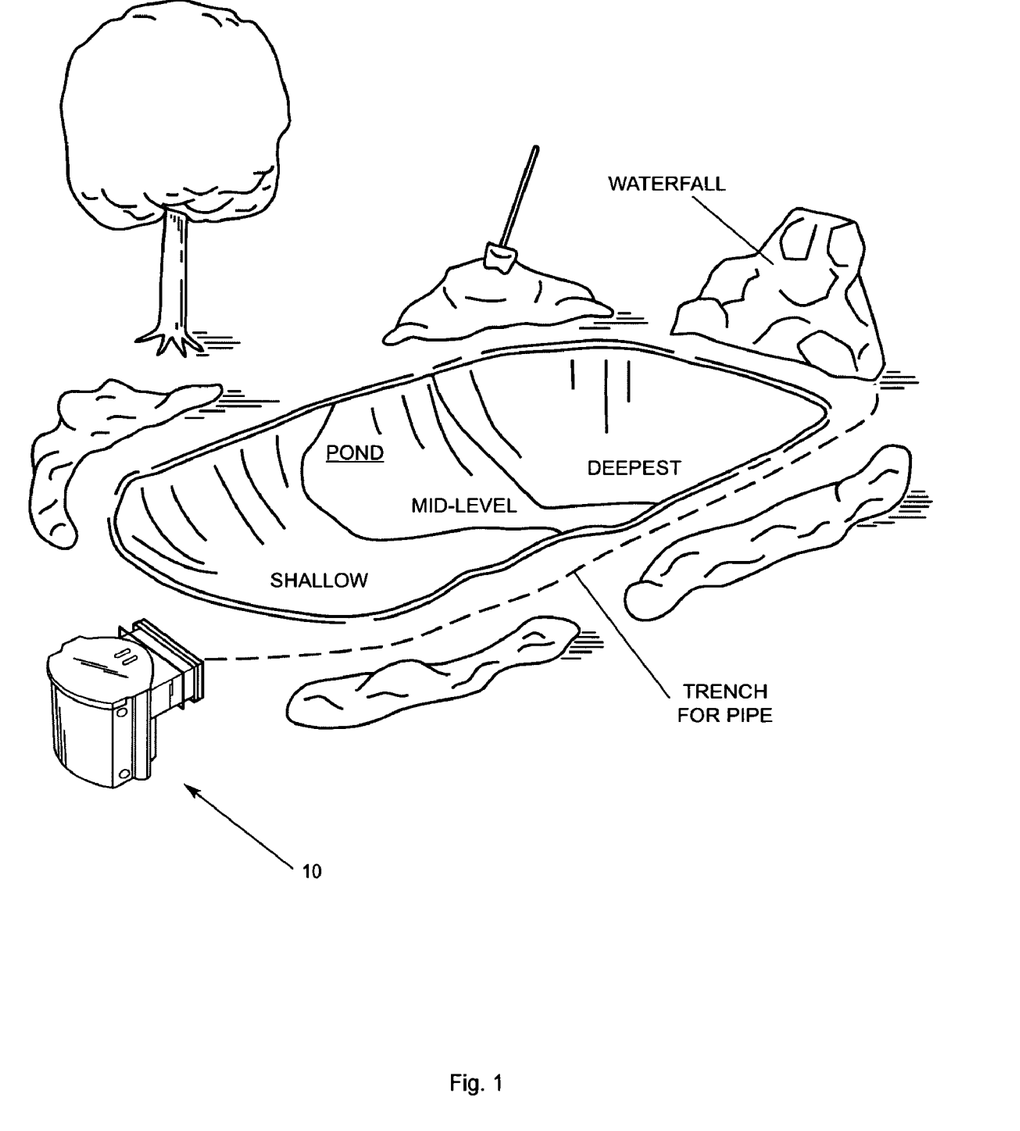
FIG. 1 is a diagrammatic sketch of a decorative pond and a skimmer-filter.

Skimmers and filters are often used in conjunction to clean and treat decorative bodies of water for landscaping, such as ponds and waterfalls. In general, skimmers skim debris from the surface of the water and filters remove smaller debris or particulate matter from the entire depth of the water. Skimmers typically filter larger debris from the water surface with a coarse net or basket, while filters incorporate filter media, which can be a variety of materials including but not limited to mats, rocks, and nylon mesh, all of which have limited capacity for water treatment. Often one or more pumps are used to draw the water to the mouth of the skimmer or filter. Once the water has been skimmed or filtered, i.e., processed, it is returned from the skimmer or filter to the body of water. Skimmers and filters are usually installed external to the body of water but in proximity to it as shown in FIG. 1. For example, many skimmers and filters are installed in the ground adjacent the body of water.

Often various passage ways in filter/skimmer configurations can easily become clogged by leaves which have fallen into the water and accumulate in the filter/skimmer. This is particularly troublesome when dealing with filter/skimmer configurations having only one passageway from a first coarse filter to a finer second filter.

BRIEF SUMMARY OF THE INVENTION

A preferred embodiment of the present invention provides an enhanced water skimming and filtering apparatus and method for debris removal from bodies of water, particularly ornamental bodies of water. The water skimmer can be used to care for e.g. a decorative pond. The water skimmer preferably comprises a housing located near the pond and an opening for receiving water from the pond. The water skimmer includes, but is not limited to, a housing basket for collecting debris, a weir, a baffle, a first opening in the baffle, and a second opening in the baffle.

The housing includes at least one baffle that partitions a skimmer chamber from other chambers. In the baffle, there may be one or more openings positioned above the midpoint of the baffle (approximately halfway along the height of the baffle) to allow water to pass from the skimmer chamber into the other chamber (e.g. UV and/or filter chamber). In addition, there may be one or more openings in the baffle positioned below the midpoint of the baffle for allowing water to pass from the skimmer chamber into the other chamber (e.g. UV and/or filter chamber) in the event of debris clogging the first opening, increased flow, filter demands, etc.

The collection basket includes an arm extending upward that comprises an opening in registry with the baffle upper opening. The second, upper opening is covered by a grate or screen.

The second chamber includes, but is not limited to, a filtration chamber that includes at least one filter for removing contaminants from water received in the housing that subsequently passes through the water skimmer and filter. This filtration chamber is in direct water communication with the skimmer chamber.

The invention preferably further comprises a UV light chamber. The UV light chamber has a system for eradicating microorganisms. The UV light chamber is in water communication with the filtration chamber whereby water passing from the skimmer chamber into the UV light chamber will pass into the filtration chamber. Additionally, the filtration chamber is in water communication with the pump chamber whereby water passing from the skimmer chamber, through the UV light chamber, and through the filtration chamber will pass through the pump chamber whereby the processed water is returned to the decorative pond.

The object of the present invention is to skim debris from the surface of a body of water and to filter and remove smaller debris or particulate matter from the entire depth of the body of water.

The advantage of the present invention is to provide an effective skimmer apparatus having a partitioning baffle, comprising one or more upper and preferably one or more lower openings that separates the skimmer chamber from other chambers. The skimmer unit continue to function if debris clogs the lower opening. Water is allowed to pass into the UV chambers and/or filter through the upper non-clogged opening. Debris that may be flowing on the surface of the water as it rises to the upper opening is blocked or screened.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

The present invention is directed to a water skimmer. Particularly, the invention is a water skimmer for use in decorative ponds which provides multiple water pathways for further processing of the water, such as by filtering, thus reducing the likelihood of clogging by debris that impedes or prevents water flow.

The preferred embodiments are shown in the drawings. A typical installation is shown in FIG. 1 and includes a pond, or more broadly, a body of water and the skimmer unit of the invention. The installation may also include a waterfall. The skimmer unit is preferably, but not necessarily, installed adjacent to the pond.

Figure 2:
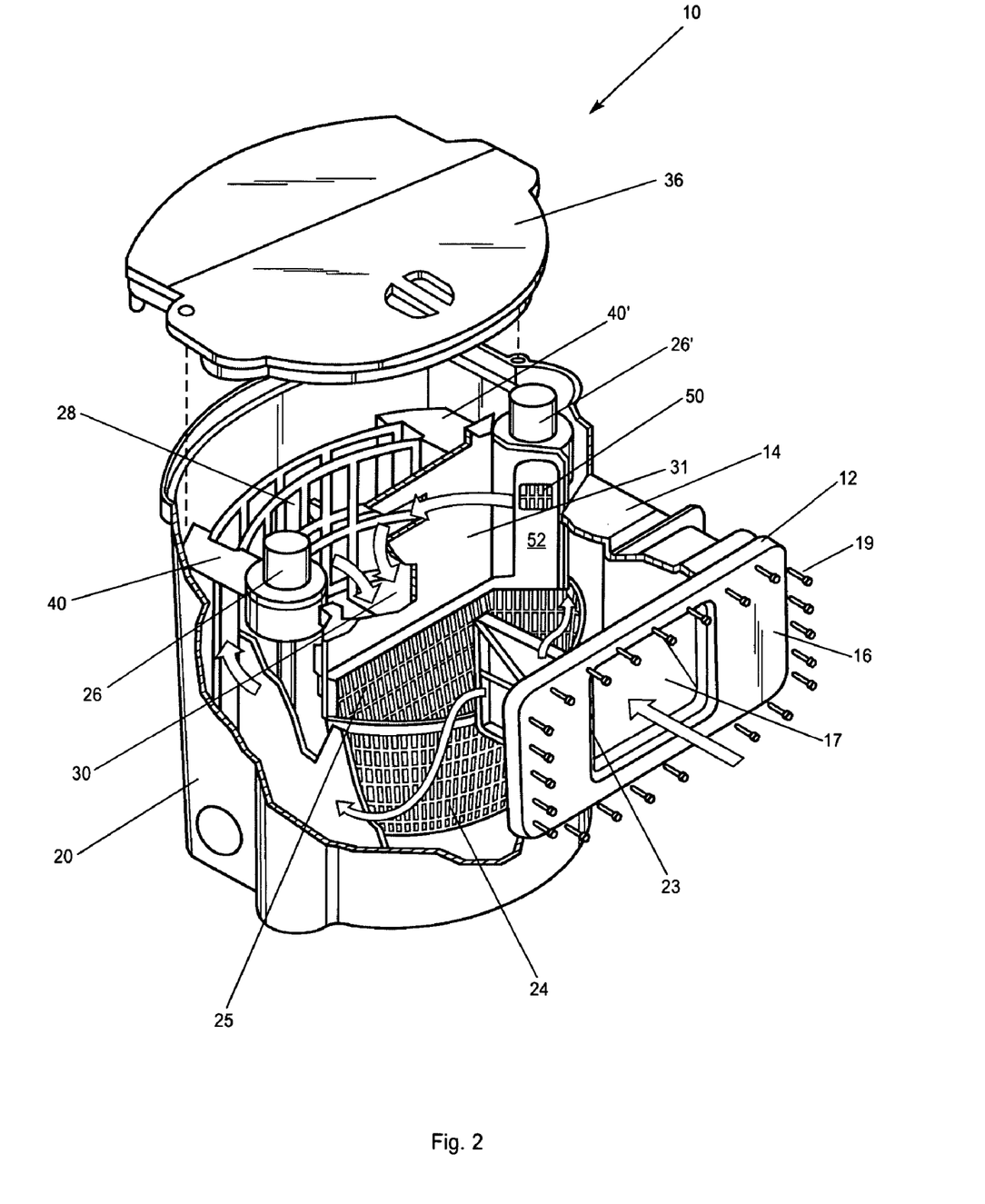
FIG. 2 is a perspective, cutaway, exploded view of a first embodiment of a skimmer and filter with two ultraviolet light chambers and a single filter cartridge in the filter chamber.

Referring to FIG. 2, a perspective, cutaway, exploded view of skimmer and filter unit 10 is shown with two ultraviolet light chambers 26 and 26'. Unit 10 includes a generally upright cylindrical tank or housing 20 and interlocking lid 36. Housing 10 is in fluid communication with a body of water via a mechanically sealed skimmer faceplate assembly 12 and elongated neck 14. Neck 14 extends outward from a wall of tank 20, the distal end of which is skimmer faceplate assembly 12. Skimmer faceplate assembly 12 provides a watertight connection to concrete, flexible membrane, or clay-lined bodies of water. Weir opening 17 is defined in weir faceplate 16 that passes water from the body of water into the housing 20. Faceplate 16 is attached to neck 14 with fasteners 19.

Figure 4:
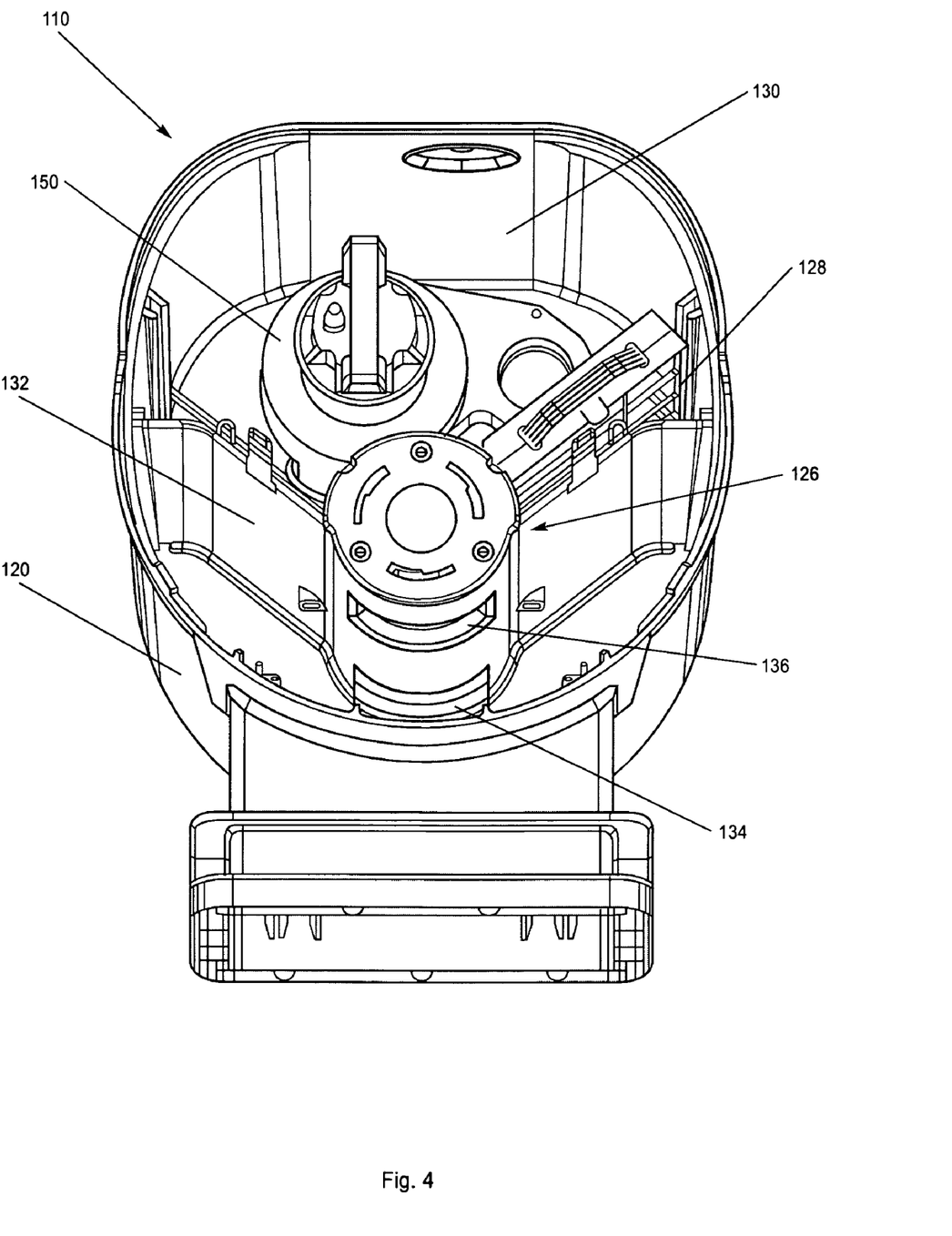
FIG. 4 is a perspective, cutaway view of the skimmer and filter of FIG. 3 showing the weir and door.

Within housing 20 are skimmer chamber 24, filtration chamber 28, two ultraviolet (UV) light chambers 26 and 26', and pump chamber 30, defined by the interior of tank or housing 20, for the removal of debris, various suspended and dissolved organic wastes, and living organisms, such as single-celled algae, protozoa, and bacteria. Housing 20 contains a container having openings for the passage of water such as a removable, semi-rigid, perforated skimmer basket 25 within skimmer chamber 24 to collect floating debris from the water after the water has passed through and over a pivoting and buoyant weir door 18 (see also FIG. 4) and past a weir divider 23. Two UV light chambers 26 and 26' are positioned and in water communication with skimmer chamber 24.

Figure 3:
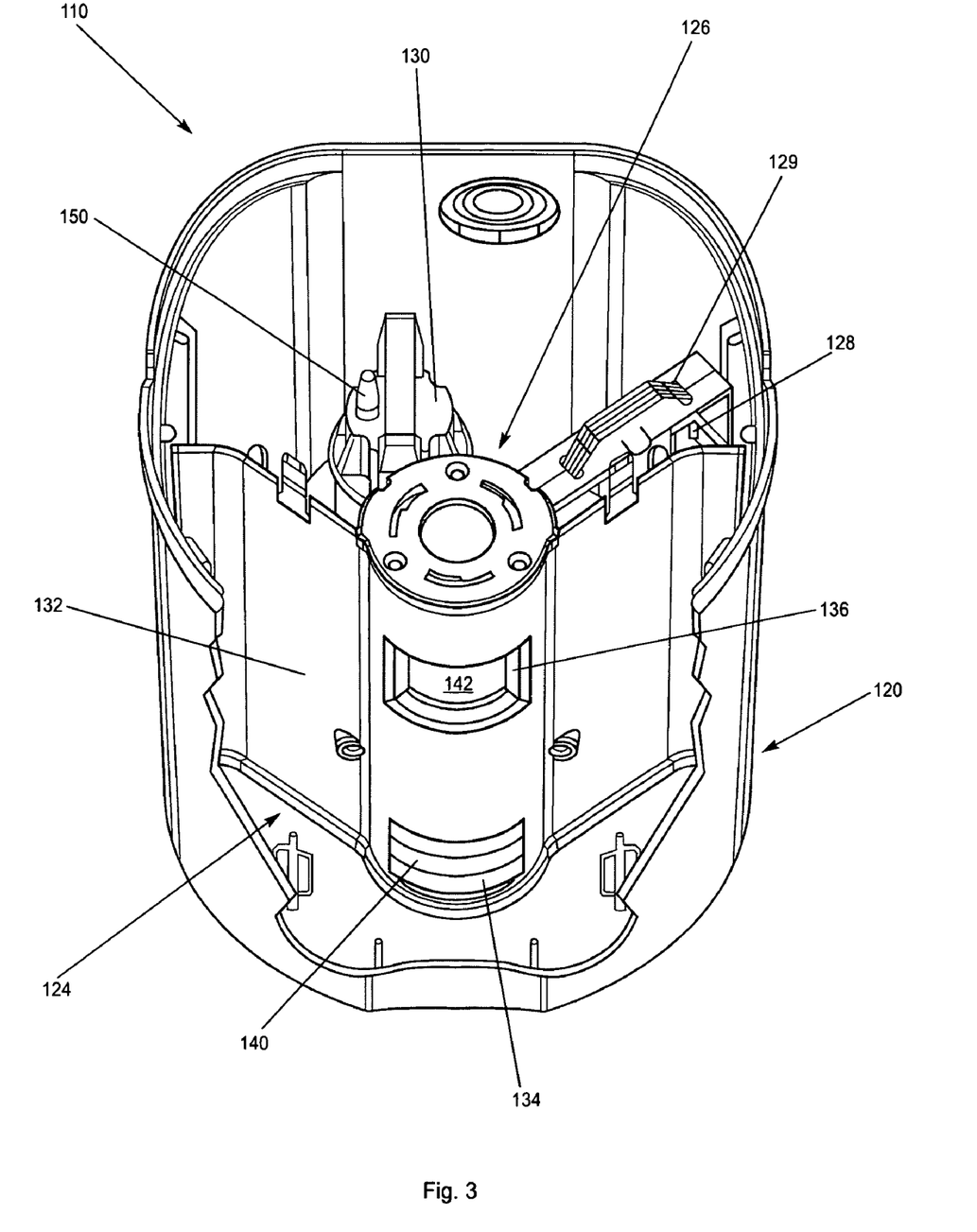
FIG. 3 is a perspective, cutaway view of a second embodiment of a skimmer and filter showing application of a single centrally located ultraviolet light chamber and two filter cartridges.

Referring now to FIG. 3, there is shown a perspective, cut-away view of a second embodiment of a skimmer and filter unit 110 shown with a single UV light chamber. The skimmer and filter unit 110 includes a generally upright cylindrical tank 120 and may have an interlocking lid as shown in the FIG. 1 embodiment. Unit 110 is in fluid communication with the body of water via a mechanically sealed skimmer face plate assembly of the type shown and described with reference to the first embodiment. Within unit 110 is a skimmer chamber 124, one or more filtration devices, one of which is shown at 128, a UV light chamber 126, and a pump chamber 130. The pump chamber 130 draws water into the skimmer and filter unit. The skimmer chamber removes the larger debris, such as leaves or other materials, from the water drawn into the skimmer filter unit, with debris collecting in basket 125. The filter 128 provides for the removal of suspended or dissolved organic waste including living organisms such as algae, protozoa and bacteria. The UV chamber 126 eradicates contaminants such as the algae, protozoa and bacteria.

The pump chamber 130 is separated from the skimmer chamber 124 by partitioning baffle 132 which also separates filters 128 that are located above pump chamber 130. Baffle 132 has a miodpoint approximately halfway along its height. One or more openings 136 are disposed above the midpoint of the baffle 132. Preferably, and additionally, one or more openings 134 are disposed below the midpoint of baffle 132. In addition, preferably one of the openings is disposed below the skimmer basket shown at 134 and another opening 136 is preferably positioned higher or above the skimmer basket upper rim.

Figure 5:
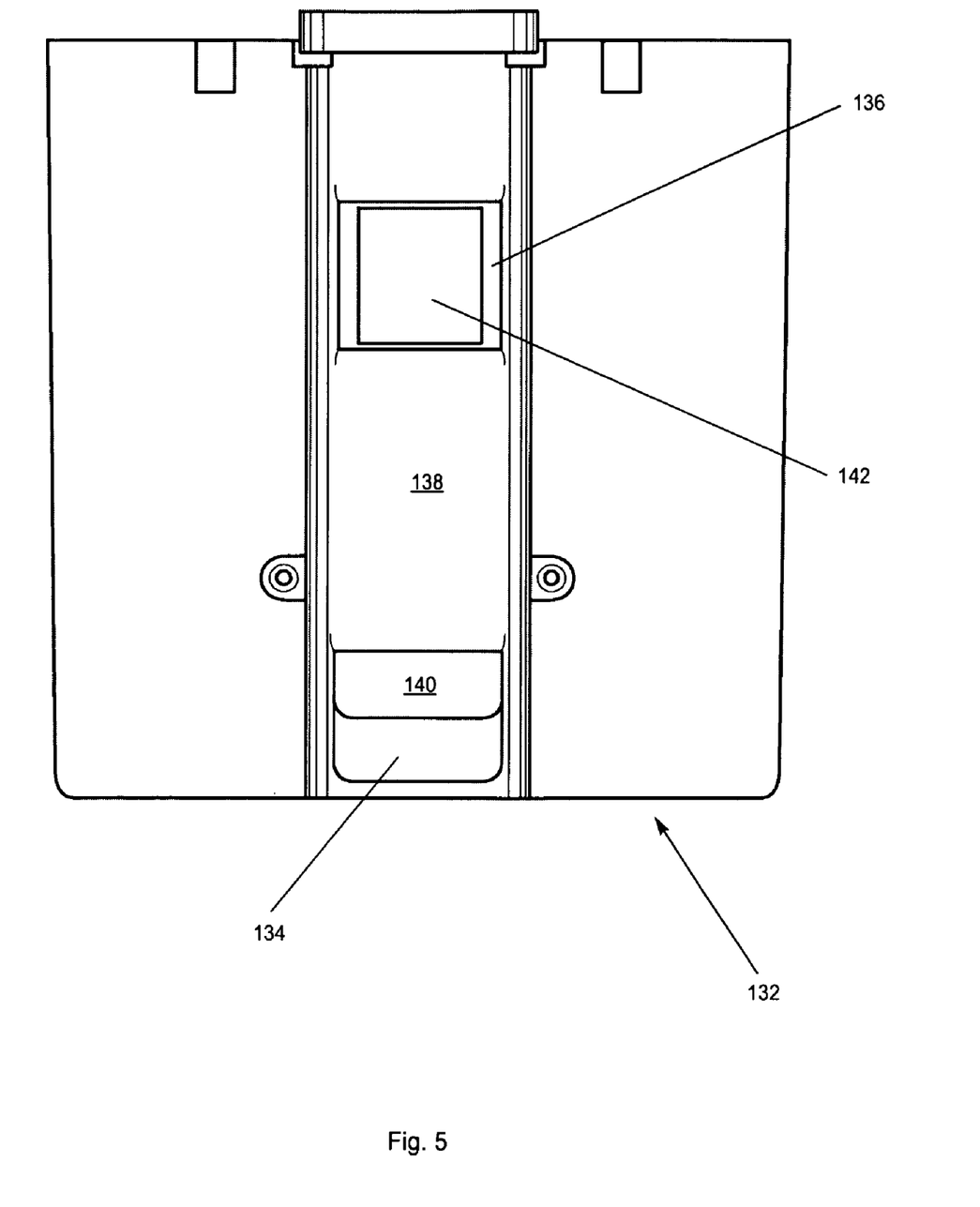
FIG. 5 is a front view of a partitioning baffle with openings for water to flow from the skimmer portion to the filter portion shown in FIG. 3.

The partitioning baffle 132 is best seen in FIG. 5 where the ports or openings 134 and 136 are shown. Opening 134 is formed in a curved portion 138 of partitioning wall 132. The curved portion 138 includes a tab 140 that descends into opening 134 but is laterally displaced so it bears against the corresponding curved portion of the UV light chamber 126. This allows water to pass through opening 134. Similarly, opening 136 includes a member 142 that is laterally displaced so as to bear against the outer wall of UV chamber 126. The pump chamber 130 includes the pump 150.

Referring back to FIG. 2, the embodiment with two UV light chambers 26 and 26', the ports or openings that are above the top level of the skimmer basket 25 are shown at 50 in the arm 52 that is connected to skimmer basket 25.

Water flow through the skimmer filter unit will be described in reference to FIG. 2, where the flow is indicated with arrows. Water enters housing 20 through opening 17 over weir door 18, and flows into skimmer chamber 24, then through the ports, one of which is shown behind screen or grate 50 located above the upper rim of basket 25. The water passing through the ports in partitioning baffle 31 flows into UV light chambers 26 and 26', which subject the water to high-intensity UV light for purification and eradication of contaminants such as single-celled algae or microorganisms. After passing through UV light chambers 26 and 26', the water flows into filtration chamber 28 for the mechanical removal of suspended solids and biological treatment for the removal of dissolved organic compounds. Filtration chamber 28, supported by UV mount 40 and 40', can perform this function with one or more cartridge-based biomechanical filter mats, or other suitable filtration methods and/or devices. After being drawn through filter chamber 28 into pump chamber 30, a pump (not shown) disposed therein pumps the processed water out of unit 10 back into the pond.

Figure 6:
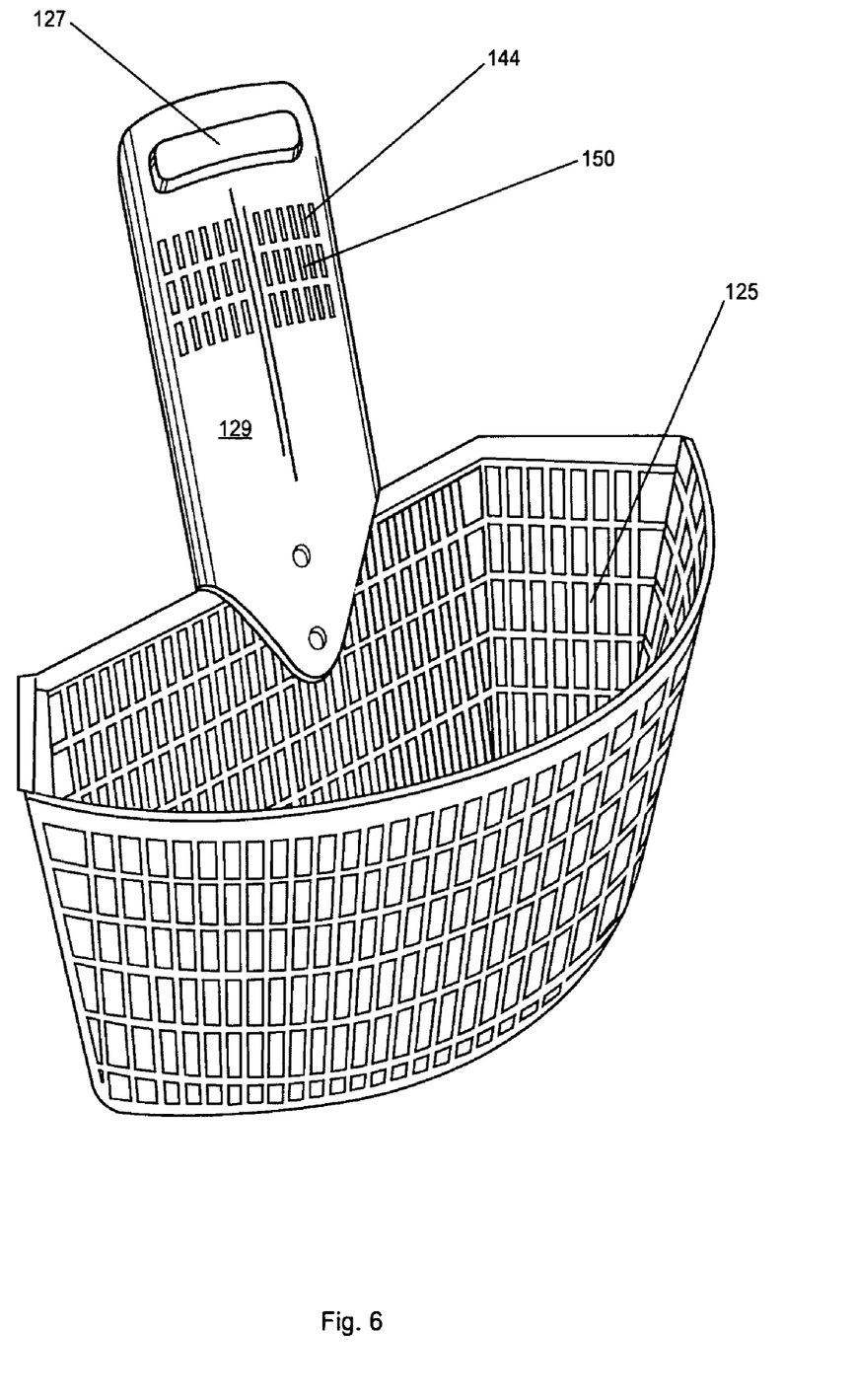
FIG. 6 is a perspective view of a skimmer basket for use in the skimmer filter shown in FIG. 3.

FIG. 6 shows a perspective view of skimmer basket 125 of skimmer chamber 124 for use in the UV light chamber (preferably single UV chamber) embodiment of FIG. 3. Skimmer basket 125 is removable by way of reaching into the interior of tank 120 and grasping handle 127 affixed to an arm 129 extending upward from the top of basket 125 so as to place handle 127 conveniently within reach after removal of the skimmer filter unit lid. In this manner, skimmer basket 125 is readily removed, cleaned, and/or replaced from tank 120 as needed. The arm 129 also includes an opening or port 144 covered by a screen 150 so as to block large debris from entering the UV chamber. Opening 144, when basket 125 is in position within skimmer chamber 124 directly overlies, or is in registry with, upper opening 136 in partition baffle 132 (see FIG. 3) thus allowing water to pass into the UV chamber even if the basket 125 is so clogged with debris that water cannot flow through basket 125 and thereby reach lower opening 134.

Figure 7:
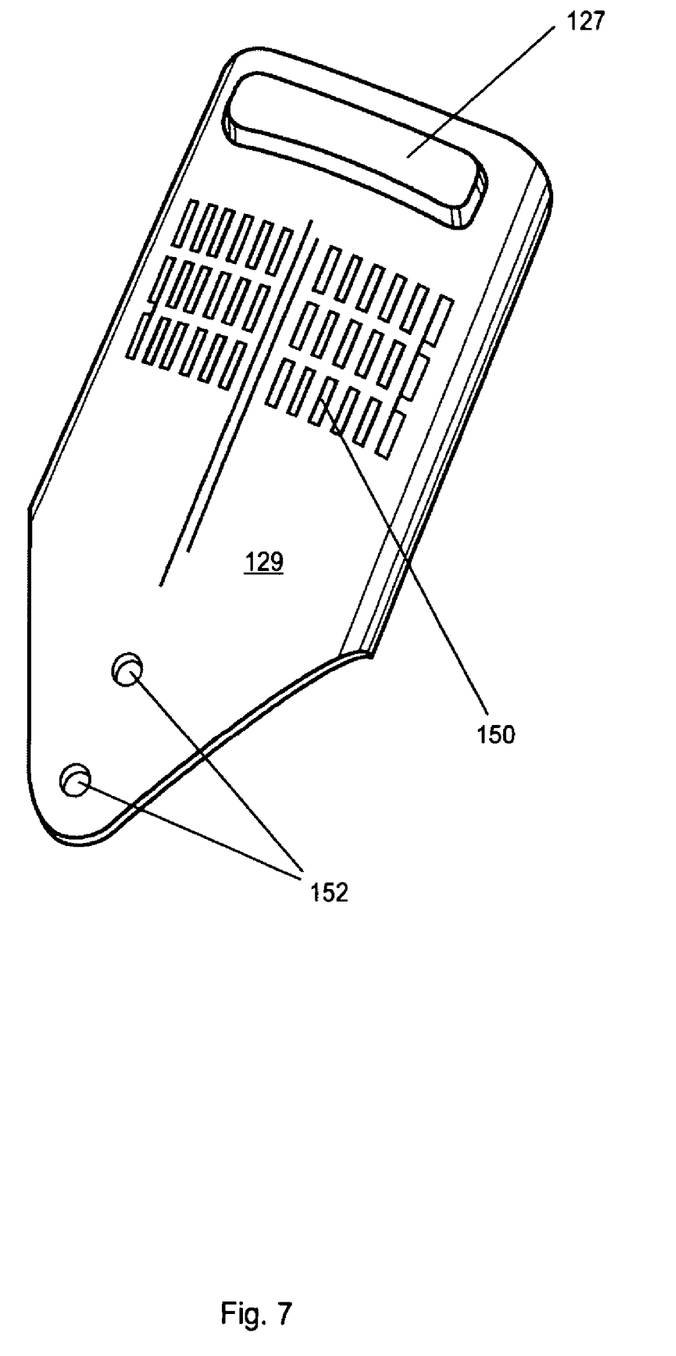
FIG. 7 is a perspective view of the basket arm shown in FIG. 6 with an opening covered by a screen or grate.

Referring to FIG. 7, the arm 129 is shown having an opening 144 and a grate 150 that is formed integrally out of the arm 129 which may be a molded plastic piece including an integral handle 127. The arm 129 is attached to basket 125 through fasteners or other attachment devices through openings 152. The purpose of the grate or screen 150 is to serve as an auxiliary blocker of larger debris when either basket 125 or lower opening 134 of the single UV light chamber embodiment shown in FIG. 3 is restricted due to foreign debris, or in the event there is increased water flow, larger flow demand and/or filter demand. In that event, the water will continue to rise in chamber 124 above the top of basket 125 and it is necessary for continued functioning of the unit that the water is allowed to pass into the UV chamber through this upper non-clogged opening. But since the debris may then be flowing on the surface of the water as it rises to the opening 144 it is still desirable to block or screen the floating debris from passing into the UV chamber from the skimmer chamber. Thus, the unit will continue to function as a skimmer as well as a filter.

Ultraviolet light purifies the water and eradicates contaminants. In the first embodiment of FIG. 2 with two UV chambers, a baffle block can be used to prevent water flow to one of the UV chambers 26 or 26'. For example, water bodies less than approximately 5000 gallons may require operation of only one UV chamber for sufficient purification. Table 1 provides examples of UV lighting power and approximate gallons per hour (GPH) of water flow required through the UV light chamber for sufficient water treatment:

TABLE 1

| Number of 25 Watt UV Lights | Number of 37 Watt UV Lights | GPH (mm-max) |
| --- | --- | --- |
| 1 | 0 | 500-2500 |
| 0 | 1 | 500-4000 |
| 1 | 0 | 1200-2500 |
| 0 | 1 | 1200-4000 |
| 2 | 0 | 1200-5000 |
| 2 | 0 | 2500-5000 |
| 0 | 2 | 2500-8000 |

When beneficial bacteria is introduced to a body of water, power is preferably removed from the UV light for approximately 24 hours to allow the bacteria to settle.

Filtering can be achieved, for example, with a biomechanical filter mat, or other suitable filtration means, secured within a housing or cartridge that is placed within the filter chamber 28 of the embodiment shown in FIG. 2.

Although the invention has been described in detail with particular reference to these preferred embodiments, other embodiments can achieve the same results. Variations and modifications of the present invention will be obvious to those skilled in the art and it is intended to cover all such modifications and equivalents. The entire disclosures of all references, applications, patents, and publications cited above are hereby incorporated by reference.

The invention claimed is:

1. A water skimmer for use with a body of water comprising:
a housing;
a surface water flow intake structure comprising a skimmer faceplate assembly, said skimmer faceplate assembly having a weir opening therein for receiving water from the body of water;
a skimmer chamber within said housing;
at least one other chamber within said housing; and
a baffle partitioning said skimmer chamber from said other chamber, said baffle comprising;
a midpoint at approximately halfway along its height, said baffle being solid about said midpoint, and
at least one upper opening in said baffle disposed above said midpoint and at least one lower opening in said baffle disposed below said midpoint for allowing one-way water flow from said skimmer chamber to said other chamber.

2. The water skimmer of claim 1 wherein said at least one upper opening in said baffle is covered by a grate or screen.

3. The water skimmer of claim 1 further comprising a basket for collecting debris.

4. The water skimmer of claim 3 wherein said basket is disposed within said skimmer chamber.

5. The water skimmer of claim 3 wherein said basket comprises an upper rim positioned below said housing water opening.

6. The water skimmer of claim 5 wherein said at least one lower opening of said baffle is disposed below said upper rim of said basket.

7. The water skimmer of claim 5 wherein said at least one upper opening of said baffle is disposed above said upper rim of said basket.

8. The water skimmer of claim 3 wherein said basket further comprises an arm extending upward from said basket, said arm having an opening, and said opening in registry with said at least one upper opening.

9. The water skimmer of claim 1 wherein said other chamber is a filtration chamber.

10. The water skimmer of claim 9 wherein said filtration chamber comprises at least one filter for removing contaminants from water received in said housing.

11. The water skimmer of claim 9 wherein said filtration chamber is in direct water communication with said skimmer chamber.

12. The water skimmer of claim 1 wherein said at least one other chamber comprises a UV light chamber.

13. The water skimmer of claim 12 wherein said UV light chamber is in direct water communication with said skimmer chamber.

14. The water skimmer of claim 12 further comprising a filtration chamber downstream of said UV light chamber.

15. The water skimmer at claim 1 further comprising a pump chamber.

* * * * *